United States Patent [19]

Yamada et al.

[11] 4,173,148
[45] Nov. 6, 1979

[54] SEMICONDUCTOR STRAIN GAUGE WITH TEMPERATURE COMPENSATOR

[75] Inventors: Kazuji Yamada; Hideo Sato, both of Hitachi; Tsutomu Okayama; Motohisa Nishihara, both of Katsuta; Yoshitaka Matsuoka, Mito; Katsuya Katohgi, Hitachiota; Yasumasa Matsuda; Satoshi Shimada, both of Hitachi, all of Japan

[73] Assignee: Hitachi, Ltd, Japan

[21] Appl. No.: 948,778

[22] Filed: Oct. 5, 1978

[30] Foreign Application Priority Data

Oct. 7, 1977 [JP] Japan .................. 52-119916

[51] Int. Cl.² .................................... G01B 7/16
[52] U.S. Cl. ........................................ 73/766
[58] Field of Search .............. 73/766, 765, 362 SC; 323/75 C, 75 N; 324/DIG. 1

[56] References Cited

U.S. PATENT DOCUMENTS 2,801,388  7/1957  Ruge ........................ 73/766 X
3,161,821  12/1964  Price et al. ................ 73/766 X Primary Examiner—Jerry W. Myracle
Attorney, Agent, or Firm—Craig and Antonelli

[57] ABSTRACT

A bridge circuit with four arms including semiconductor strain gauge elements has input terminals for coupling a DC power supply with a pair of diagonally opposite junctions of the bridge circuit per se and output terminals coupled with a pair of remaining diagonally opposite junctions. Initial zero-point temperature compensators each are connected in series and in parallel to each of semiconductor strain gauge elements on adjacent two arms of the bridge circuit. Temperature compensators for zero-point shift adjustment are each provided between the adjacent arms closer to each output terminal. A temperature compensator for span adjustment is provided between one of the input terminals and the DC power source. A constant current control unit for feeding a constant current to the bridge circuit is provided between the other input terminal and the DC power supply.

7 Claims, 11 Drawing Figures

SEMICONDUCTOR STRAIN GAUGE WITH TEMPERATURE COMPENSATOR

BACKGROUND OF THE INVENTION

1. Field of the Invention

The present invention relates to a semiconductor strain gauge and, more particularly, to a semiconductor strain gauge with a temperature compensator for preventing an output of a bridge circuit comprised of semiconductor strain gauge elements from changing with the change of ambient temperature in a zero-point shift adjustment.

2. Description of the Prior Art

In one of known semiconductor strain gauges, which is described in Japanese Laying-open of Patent Application No. 80251/'76, for example, a temperature compensator is used to prevent an output voltage of the bridge circuit comprising semiconductor strain gauge elements from changing with the change of ambient temperature in a zero-point shift adjustment. In the zero-point shift adjustment, the output voltage of the bridge circuit is adjusted to zero while a substantial pressure or strain is applied to the semiconductor elements.

The known strain gauge, however, has a problem that it is difficult to keep constant the output voltage of the bridge circuit, while the ambient temperature changes greatly.

SUMMARY OF THE INVENTION

Accordingly, an object of the invention is to provide a bridge-connection semiconductor strain gauge with a temperature compensator capable of easily and accurately compensating for a variation of an output voltage of the bridge circuit comprising semiconductor strain gauge elements due to temperature change in the zero-point shift adjustment.

Another object of the invention is to provide a bridge-connection semiconductor strain gauge which can facilitate a temperature compensation easily and accurately even if ambient temperature changes greatly.

A further object of the invention is to provide a bridge-connection semiconductor strain gauge with a temperature compensator in which a span compensation of the bridge circuit comprising semiconductor strain gauge elements is hardly effected by variation of the ambient temperature.

To achieve the objects, a temperature compensator used in a semiconductor strain gauge according to the invention is arranged to have a temperature coefficient of resistance equal to that of a sensitivity of the strain gauge element and to include a resistive element having a selected parameter as a temperature sensitive element.

Other objects and features of the invention will be apparent from the following description taken in connection with the accompanying drawings.

DESCRIPTION OF THE PREFERRED EMBODIMENT

Figure 1:
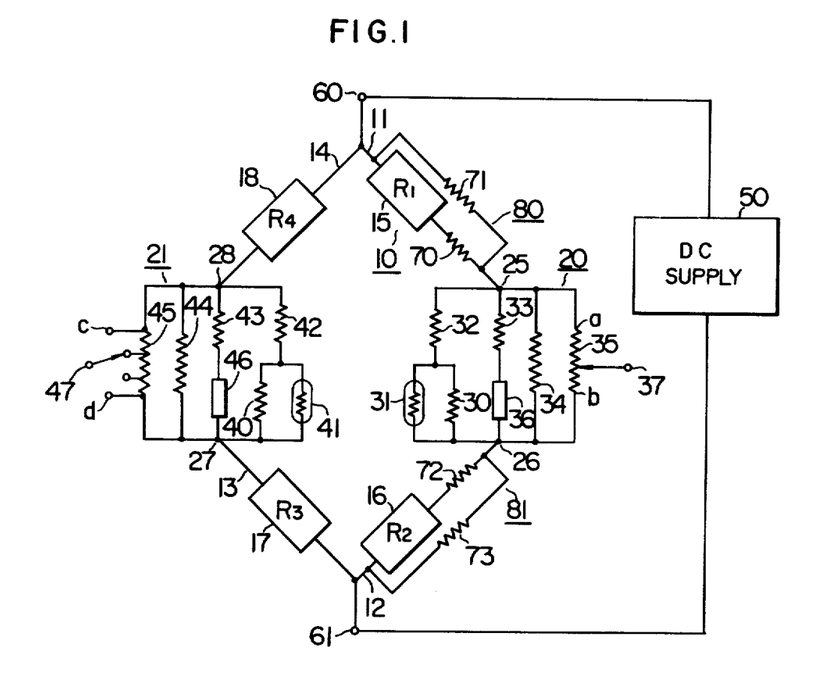
FIG. 1 shows a circuit diagram of a basic circuit construction of a semiconductor strain gauge with temperature compensator according to the invention.

As shown in FIG. 1, a semiconductor strain gauge according to the invention is comprised of a bridge circuit 10 with four arms, i.e. bridge elements, 11 to 14 having resistors 15 to 18 including semiconductor strain gauge elements $R_1$, $R_2$, $R_3$ and $R_4$, initial zero-point temperature compensators 80 and 81, and temperature compensators 20 and 21 for the zero-point shift adjustment.

The bridge circuit 10 is provided with input terminals 60 and 61 which are connected to a DC supply 50 for exciting the bridge circuit and output terminals 37 and 47 through which an output voltage of the bridge circuit is taken out.

The initial zero point temperature compensators include a compensator 80 connecting to the arm 11 and a compensator 81 connecting to the arm 12. The compensator 80 is comprised of a series circuit of a semiconductor strain gauge element $R_1$ and a fixed resistor 70 and a fixed resistor 71 connected parallelly to the series circuit. The compensator 81 is comprised of a series circuit of a semiconductor strain gauge element $R_2$ and a fixed resistor 72, and a fixed resistor 73 connected across the series circuit. The initial zero-point temperature compensators serve to adjust to zero the output of the bridge circuit 10 with no-strain and to compensate for a deviation of the zero point due to temperature change so as to keep the zero point constant, by equalizing the resistances and the resistance temperature coefficients of the respective semiconductor strain gauge elements.

Figure 2:
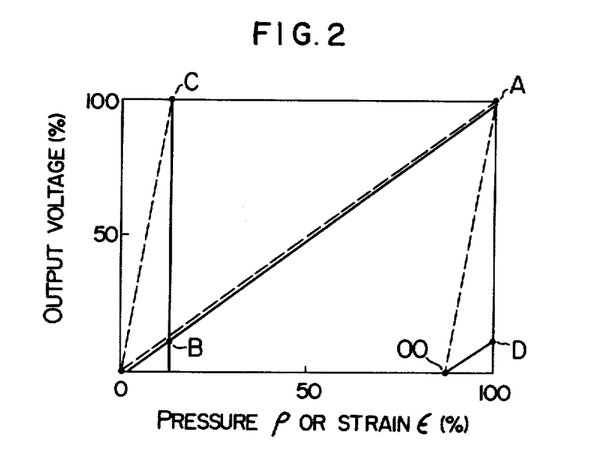
FIG. 2 shows a graph for illustrating a zero-point shift adjustment.

FIG. 2 shows a graph illustrating the operation of the zero-point adjustment. In the figure, the abscissa represents a pressure or strain $\epsilon$ (input) applied to the semiconductor strain gauge elements assembled into the bridge circuit and the ordinate represents an output voltage of the bridge circuit. Solid lines indicate the input-output characteristics of the bridge circuit while broken lines indicate the input-output characteristics of the bridge circuit when the output of the bridge circuit is amplified. In one of the general uses, the bridge circuit is adjusted to obtain 100% output with 100% input, as indicated by a straight line $\overline{OA}$. In this case, for convenience of explanation, the amplifier gain is assumed "1". Another general use of the bridge circuit is to obtain an input-output characteristic as indicated by a straight line $\overline{OC}$. In this use, an output voltage $\overline{OB}$ from the bridge circuit 10 produced by an input below 100% is amplified with a larger gain to obtain a 100% output denoted as $\overline{OC}$. Still another use of the bridge circuit is a zero-point shift adjustment. In this mode of use, outputs as indicated by lines $\overline{OO,D}$ and $\overline{OO,A}$ are obtained. As shown, the output of the bridge circuit is adjusted to be zero with an input denoted as OO and to steeply increase from zero to 100% with an input increasing from OO to 100%, by increasing the gain of the amplifier. According to the use of the bridge circuit in the last mode, the pressure P or strain $\epsilon$ may be measured with a high sensitivity. The mode of use in which the bridge output is adjusted to be zero with a given input other than zero, as mentioned above, is called a zero-point shift adjustment.

The resistance temperature coefficient of the semiconductor strain gauge element developed when no pressure P or strain $\epsilon$ is applied to the gauge element is different from the temperature coefficient of resistance change quantity, i.e. a sensitivity $\Delta R$, developed when some pressure or strain is applied to the gauge element. In FIG. 1, the compensators 80 and 81 are used to adjust the resistance temperature coefficients of the bridge elements to be equal when no pressure P or strain $\epsilon$ is applied to the gauge elements, that is, at the initial zero-point adjustment and to adjust the output of the bridge circuit to be zero. The temperature compensators 20 and 21 in FIG. 1 adjust to zero the output of the bridge circuit at the zero-point shift adjustment, and prevents the zero point from being shifted with temperature variation.

The temperature compensator 20 or 21 is comprised of the following first to third circuits parallely connected.

(1) A first circuit having a temperature sensitive element 36 or 46 with a positive primary temperature coefficient and a resistor 33 or 43, connected in series to the element 36 or 46. For the temperature sensing element is used a semiconductor strain gauge element which is disposed at a location where no stress (or distortion) is applied or along a crystal axis insensitive to stress or strain, or a bulk type semiconductor resistive piece cut out along the crystal axis insensitive to stress or strain or a resistive element formed by a diffusion technique.

(2) A second circuit having a parallel circuit including a thermistor 31 or 41 and a resistor 30 or 40 connected in parallel with the thermistor and a resistor 32 or 42 connected in series to the parallel circuit.

(3) A third circuit having a fixed resistor 33 or 34 and a variable resistor 35 or 45 with an intermediate terminal 37 or 47 which is connected in parallel with the fixed resistor. The intermediate terminals 37 and 47 are used as the output terminals of the bridge circuit. The variable resistor 45 may be a variable resistor with taps.

Let us now consider a necessary condition for the temperature compensator for the zero-point shift adjustment in the circuit construction 20 or 21. Firstly, the initial zero-point adjustment is carried out in such a manner that under a condition of no strain, the terminals 25 and 26, and 27 and 28 in the temperature compensators 20 and 21 are shortcircuited and the resistors 71 and 73 of the temperature compensators 80 and 81 are adjusted so that the output of the bridge circuit is zero. When the temperature compensators 20 and 21 are connected to the bridge circuit 10, the potentials appearing at the output terminals 37 and 47 (the terminal 61 is placed at zero potential) are given $$V_{37} = (R - \Delta R_2 + R_Z \cdot \alpha) \frac{2R + R_Z + \Delta R_3 - \Delta R_4}{2(2R + R_Z) + \Delta R_1 - \Delta R_2 + \Delta R_3 - \Delta R_4} I \quad (1)$$

$$V_{47} = (R + \Delta R_3 + R_Z \cdot \beta) \frac{2R + R_Z + \Delta R_1 - \Delta R_2}{2(2R + R_Z) + \Delta R_1 - \Delta R_2 + \Delta R_3 - \Delta R_4} I \quad (2)$$

where I is a current flowing through the path between input terminals 60 and 61. The resistances of the arms 11 to 14 under no strain condition are all equal and denoted as R since those are adjusted through the initial zero adjustment. $\Delta R_1$ to $\Delta R_4$ designate resistance changes of the arms under the application of a strain $\epsilon$. $\alpha$ is a factor representing a slider content position of the variable resistor 35 and having a value of "0" when the slider contact position is at the point b, and "1" when it is at the point a, $\beta$ is a factor representing a slider contact position of the variable resistor 35 and having a value of "0" when the slider contact position is at the point d, and "1" when it is at the point c, $R_{Z1}$ is an impedance between the terminals 25 and 26 of the temperature compensator 20. $R_{Z2}$ is an impedance between the terminals 27 and 28 of the temperature compensator 21.

Here, if $R_{Z1} = R_{Z2} = R_Z$ $\Delta R_1 \approx \Delta R_2 \approx \Delta R_3 \approx \Delta R_4 = \Delta R$ The output voltage $V_o$ derived between the output terminals 37 and 47 is expressed $$V_o = V_{37} - V_{47} \approx \{-2\Delta R + R_Z(\alpha - \beta)\} I/2 \quad (3)$$

The equation (3) implies that the output voltage $V_o$ of the bridge circuit shown in FIG. 1 may be adjusted to zero by merely adjusting the factors $\alpha$ and $\beta$. In other words, the zero point adjustment in the zero-point shift adjustment for making the output voltage zero, means the adjustment of the factors $\alpha$ and $\beta$.

Therefore, when the output voltage of the bridge circuit is adjusted to zero, the following equation holds $$2\Delta R = R_Z(\alpha - \beta) \quad (4)$$

Taking the logarithms of both sides of the equation (4), we have $$l_{n2} + l_n\Delta R = l_n R_Z + l_n(\alpha - \beta) \quad (5)$$

Differentiating the equation (5) with respect to temperature T, we have $$\frac{1}{\Delta R} \frac{\partial \Delta R}{\partial T} = \frac{1}{R_Z} \frac{\partial R_Z}{\partial T} \quad (6)$$

The assuming that $\alpha$ and $\beta$ are not changed after the initial adjustment, that is to say, these must be fixed after they are adjusted initially at a given temperature. Thus, in order that the output voltage of the bridge circuit in the zero-point shift adjustment is not changed with ambient temperature variation, the temperature coefficient of the temperature compensator 20 or 21 must be $1/R_Z \, \partial R_Z/\partial T$ which is nothing but the temperature coefficient $1/\Delta R \, \partial R/\partial T$ of the sensitivity $\Delta R$ of the semiconductor strain gauge element. This is the principle of the zero-point temperature compensation in the zero-point shift adjustment.

The conditions required for the impedance $R_Z$ as viewed from two terminals 25 and 26 (or 27 and 28) of the temperature compensator 20 (or 21) are as follows (the explanation to follow relates to only the temperature compensator 20):

(a) The temperature characteristic of $R_Z$ must satisfy the equation (6).

(b) In the zero-point shift adjustment, it is possible to adjust the zero-point with application of a given range of stress merely by moving the middle tap 37 of the variable resistor 35.

(c) If the temperature characteristic shown by the equation (6) of the semiconductor strain gauge is different between the strain gauge elements, the condition (a) must be satisfied by changing the circuit constants of the resistors 30, 32 to 35 while using the temperature sensitive resistive elements of the same kind for the temperature sensitive resistive elements 31 and 36.

(d) In order to satisfy the condition (c), it is preferable to use semiconductor strain gauge elements of which the resistance change $\Delta R$ due to stress (strain) is little affected by temperature variation in view of easy construction of the temperature compensator. This may be realized by using semiconductor strain gage elements of approximately $2 \times 10^{18}$ cm$^{-3}$ of impurity concentration. With such an impurity concentration, the primary temperature coefficient of $\Delta R$ is almost zero. A typical example of the temperature characteristic of $\Delta R$ of the diffusion type semiconductor strain gauge element is graphycally illustrated in FIG. 3. The ordinate in FIG. 3 corresponds to the left-hand term of the equation (6). The primary temperature coefficient in the vicinity of 20° C. is negative and the impurity concentration is slightly larger than, $2 \times 10^{18}$ cm$^{-3}$. As seen from the characteristic curve in FIG. 3, the temperature coefficient of the sensitivity $\Delta R$ includes high order components. For example, when the reference temperature is set at 20° C., the primary temperature coefficient $C_1 \simeq -3.8 \times 10^{-4}$ (°C.$^{-1}$), the secondary temperature coefficient $C_2 \simeq 9.2 \times 10^{-6}$ (°C.$^{-2}$), and the third temperature coefficient $C_3 \simeq -3.9 \times 10^{-8}$ (°C.$^{-3}$). The compensating circuit according to the invention can satisfactorily compensate for such a temperature characteristic including high order components. Incidentally, the temperature coefficient of resistance of the element having $2 \times 10^{18}$ cm$^{-3}$ of impurity concentration is approximately 20%/100° C.

Figure 3:
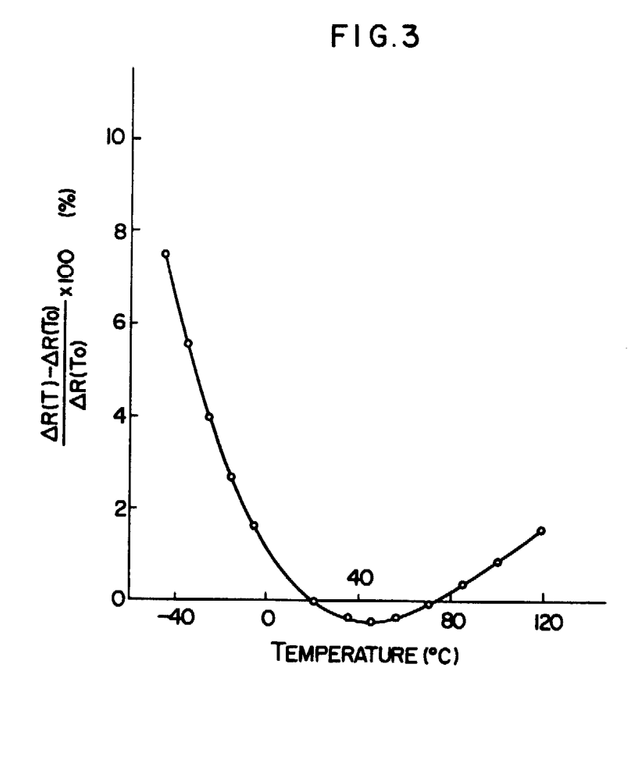
FIG. 3 shows a graph illustrating the variation of the temperature coefficient of the sensitivity of a semiconductor strain gauge element with respect to ambient temperature.

The explanation will be made of the relation of the circuit constant of the temperature sensitive resistor and the resistance value, referring to the other drawings. The resistance value of the resistor 30 is designated by R30; that of the resistor 32 by R32; that of the resistor 33 by R33; that of the parallel circuit of resistors 34 and 35 by R34. The temperature characteristic shown in FIG. 3 is also typically applied for the temperature characteristic of $\Delta R$.

Figure 4A:
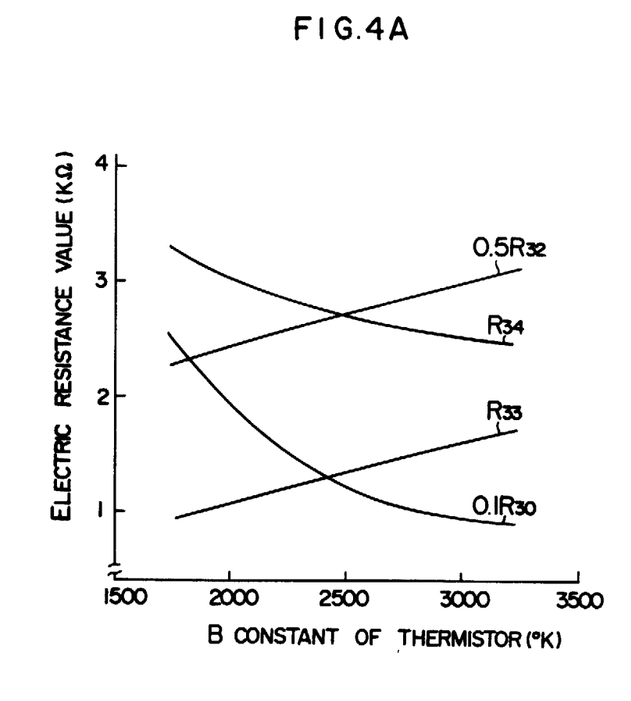
FIG. 4A graphically illustrates the variations of electric resistance values of the resistors in a temperature compensator for the zero-point shift adjustment used in the present invention with respect to the B constant of a thermistor, the variations of the electric resistance values showing the characteristics of the resistors in the temperature compensator for compensating for the temperature characteristic of the semiconductor strain gauge element shown in FIG. 3.

FIG. 4A shows relations between the B constant of a thermistor and the resistance values of the resistors used in the temperature compensator 20. Here, $R_{TC}$ is 2 K$\Omega$, $R_{CO}$ 2 K$\Omega$, and $R_{ZO}$ 1.2 K$\Omega$, where $R_{TO}$, $R_{CO}$ and $R_{ZO}$ indicates the resistance values of the thermistor 30, temperature sensitive resistor 36 and the temperature compensation circuit, respectively, at 0° C.

Figure 4B:
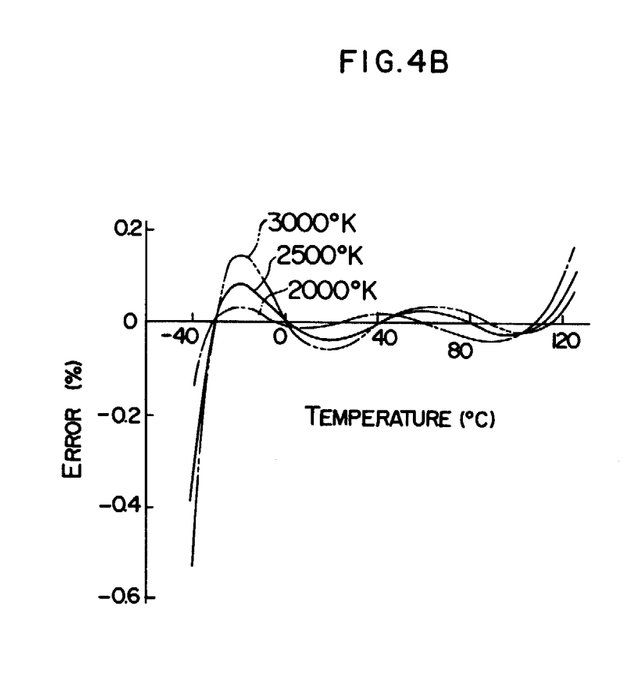
FIG. 4B graphically illustrates compensation errors in the temperature compensator of the invention when the characteristic shown in FIG. 3 is compensated.

Assume that, when temperature is $T_O$, the resistance value is $R_O$ and when it is T, the value is R. On this assumption, a relation $\exp B(1/T - 1/T_O)$ holds. Here, B is called B constant (the sensitivity of temperature). The example to be given is a case where the resistance values are selected so as to satisfy the condition (a) under the following specific condition, although various conditions are possible in the circuit according to the invention. That is, the resistance value $R_{TO}$ of the thermistor 30 at 0° C. is 2 K$\Omega$, the resistance value $R_{CO}$ of the temperature sensitive resistor 36 is 2 K$\Omega$, and that $R_{ZO}$ of the temperature compensation circuit at 0° C. is 1.2 K$\Omega$. Within a range of 1500° to 4000° K. of the B constant of the thermistor, the resistance values R30, R33, R34 and R32 can satisfy the condition (a), with attainable values; however, the degree of the satisfaction varies depending on the B constant value. Approximate errors of B constants 2000°, 2500°, 3000° K. are shown in FIG. 4B. The approximate error means an error found between the temperature coefficient of the sensitivity of the gauge element shown in FIG. 3 and that by the temperature compensator according to the invention, expressed in terms of %. As seen FIG. 4B, within the temperature range $-40°$ to 120° C., the smaller the B constant, the better the degree of approximation; however, the errors fall substantially within $\pm 0.5\%$.

Figure 5:
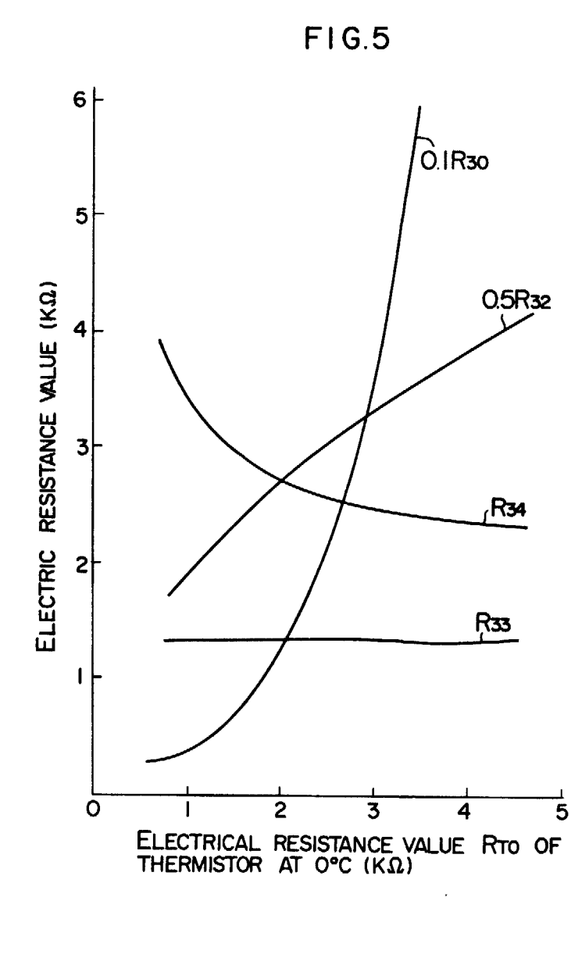
FIG. 5 shows characteristic curves illustrating variations of the resistance values of the respective resistors in the temperature compensator according to the invention with respective to a resistance value at 0° C. of a thermistor used for compensating for the temperature characteristic shown in FIG. 3.

FIG. 5 shows relations between an electrical resistance value $R_{TO}$ of a thermistor at 0° C. and the respective resistance values. The remaining parameters are: B=2500° K., $R_{CO}$=2 K$\Omega$, and $R_{ZO}$=1.2 K$\Omega$. When $R_{TO}$ changes, the value of R30 for satisfying the equation (6) greatly changes. When $R_{TO}$ is 0.5 to 5 K$\Omega$, it is deemed that the value of R30 is realizable. The remaining resistance values are sufficiently realizable within $R_{TO}$. In the invention, preferable values of $R_{TO}$ are 0.5 to 5 K$\Omega$.

Figure 6:
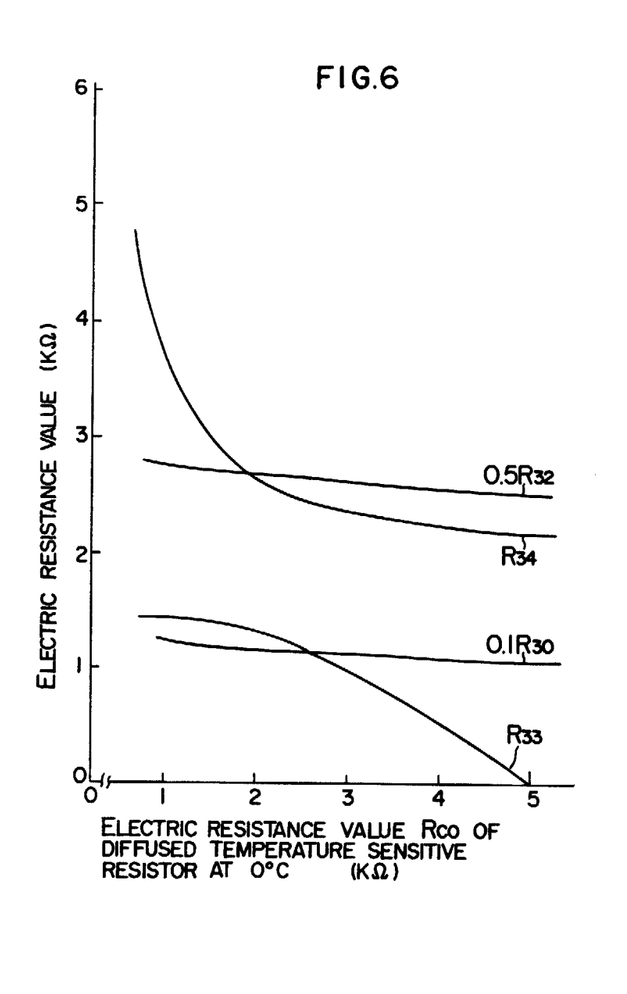
FIG. 6 shows characteristic curves illustrating variations of the resistance values of the resistors in the temperature compensator of the invention with respect to a resistance value of a diffused temperature sensitive resistor at 0° C. used for compensating for the temperature characteristic shown in FIG. 3.

FIG. 6 shows a graphical representation of the relations of the respective resistance values to an electrical resistance value $R_{CO}$ of a diffused temperature sensitive resistor at 0° C. The remaining parameters B=2500° K., $R_{TO}$=2 K$\Omega$, and $R_{ZO}$=1.2 K$\Omega$. $R_{CO}$ must be more than 0.5 K$\Omega$ for avoiding an extreme increasing of R34 and less than 5 K$\Omega$ for avoiding a negative value of R33, as shown. However, the limitation imposed on the resistance value of $R_{CO}$ is not decisive but changeable if the fixed parameters are changed. For example, the upper limit of $R_{CO}$ may be further increased to about 1.5 K$\Omega$.

As described above, if a suitable condition for the temperature sensitive element is selected, the following useful effects are obtained.

Figure 7:
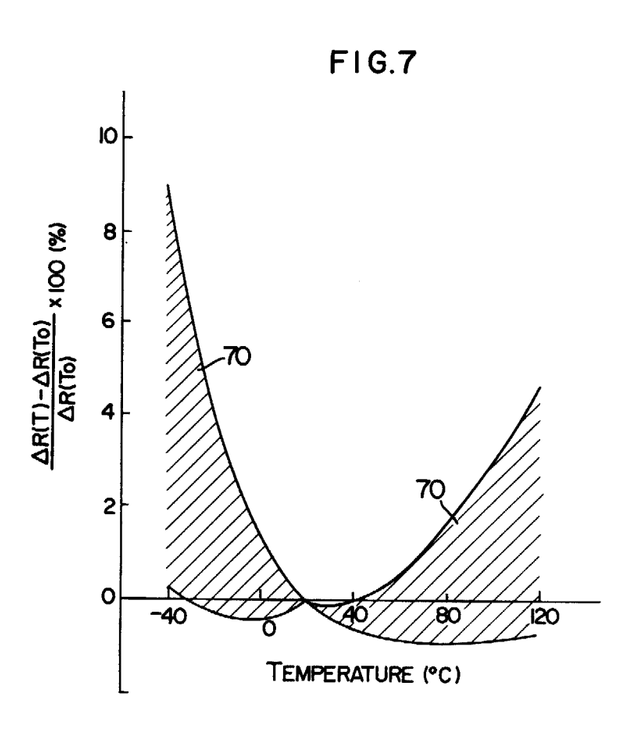
FIG. 7 shows characteristic curves illustrating a scope of the temperature coefficient of the sensitivity of each semiconductor strain gauge element which may be compensated by the temperature compensator according to the invention.

One of such effects is that the temperature compensation over a wide range of the ΔR characteristic is possible merely by selecting proper resistance values of the resistors (30, 32, 33, 34 and 35). As shown by the characteristic in FIG. 7, the temperature compensation is made over a wide range of the characteristic of ΔR, with an error of about 0.2% or less. In case of the diffusion type semiconductor strain gauge, the variation range of its temperature characteristics due to variation of its impurity concentration in manufacturing in usually within the above range. Accordingly, the temperature compensation can satisfactorily be applied to any of usually obtained semiconductor strain gauge elements. Further, the fact that the condition (c) is satisfied, that is, it is unnecessary to prepare various kinds of resistors for the thermistor 31 and the temperature sensitive resistor, and to select a specific one from them is of significant important in practical use. The temperature sensitive elements must be assembled closer to the semiconductor strain gauge element that is to say, at a location where the removal or change of the temperature sensitive element is very difficult. It is very inconvenient, therefore, to select a specific one from several different kinds of elements. In the invention, it is enough to prepare only one for each of those elements and the selection is needed only for the resistors. This fact results in very high reliability and productivity. Incidentally, the characteristic curves in FIG. 7 are depicted under the condition that $R_{TO}$ is 0.5 to 5 KΩ, $R_{CO}$ is 0.5 to 5 KΩ, $R_{ZO}$ is below 1.2 KΩ and B ranges from 2000° to 3000° K.

Figure 8:
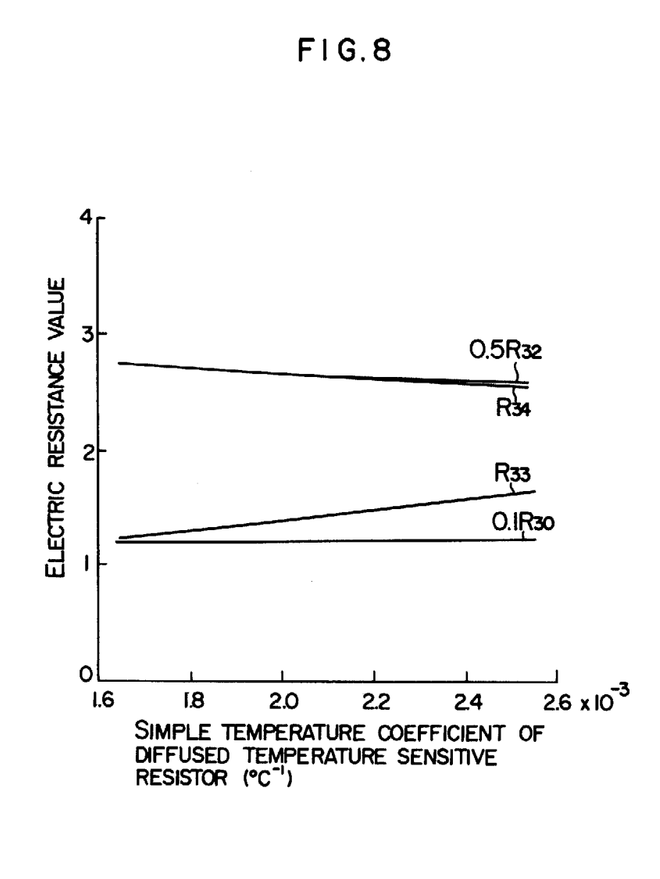
FIG. 8 illustrates variations of the resistance values of the resistors in the temperature compensator of the invention with respect to the simple temperature coefficient of the diffused temperature sensitive resistor used for compensating for the temperature characteristic shown in FIG. 3.

The second effect is that, as shown in FIG. 8, the resistance values of the respective resistors change very little with variation of the simple temperature coefficient of the diffused temperature sensitive resistor and therefore the temperature compensation of the invention may surely be embodied even if the diffusion concentration of the temperature sensitive resistor changes. When the diffusion type semiconductor strain gauge is used, the resistive member diffused along the insensitive crystal axis is used for the temperature sensitive resistor in most cases. Usually, the impurity concentrations of resistive elements are slightly different from lot to lot of diffusion so that the temperature coefficient of the diffused resistive element as well as the temperature characteristic of ΔR frequently changes. However, the variation is at most ±10%. Therefore, if the ΔR of the gauge and the temperature coefficient of the temperature sensitive resistive element change, satisfactory compensation may be carried out by properly selecting the resistors. In FIG. 8, B is 2500° K, $R_{TO}$ is 2 KΩ and $R_{ZO}$ is 1.2 KΩ.

Figure 9:
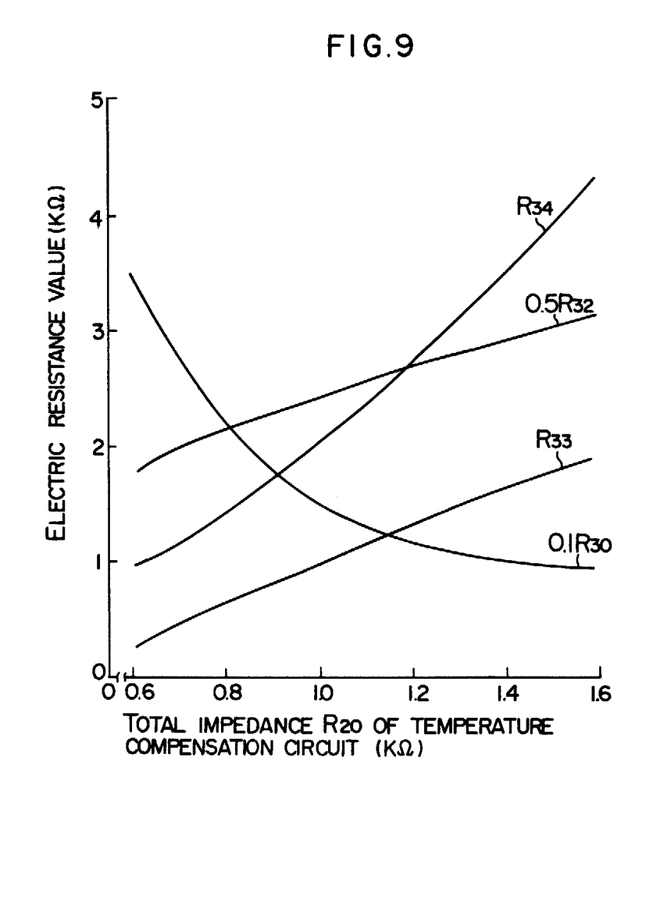
FIG. 9 shows variations of the resistance values of the resistors in the temperature compensator of the invention with respect to the total impedance of the temperature compensation circuit of the invention used for compensating for the temperature characteristic shown in FIG. 3.

Third effect is that, even if the total impedance of the compensating circuit is greatly changed, the compensation can be made satisfactorily, as shown FIG. 9. As previously described, the total impedance is determined by the maximum shift value in the zero-point shift adjustment. The problem is accordingly depending on what percentages of the input full scale of the gauge are to be shifted in the zero-point shift adjustment. Thus, the total impedance can not be determined definitely and some flexibility is required in determining the total impedance. Accordingly, the embodiment of the invention can well afford a satisfactory temperature compensation within the range of 0.7 to 1.6 KΩ. This is very advantageous in practical use.

The embodiment shown in FIG. 1 employs a pair of temperature compensators 20 and 21. However, a single compensator, if it satisfies the condition of the equation (6), may be employed. Further, in case where two temperature compensators 20 and 21 are used the same construction is applicable to both the compensators.

Figure 10:
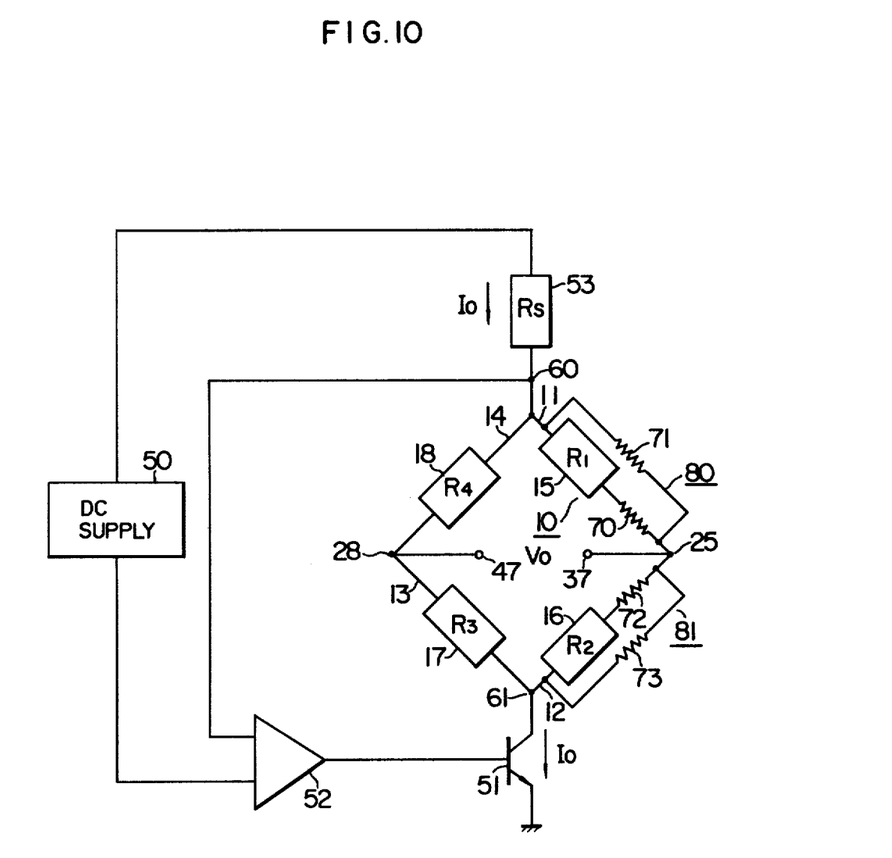
FIG. 10 shows a circuit diagram of a span compensation circuit for making a span compensation of the semiconductor strain gauge.

A span compensation of the semiconductor strain gauge also needs a compensation circuit with the same characteristic as the above-mentioned temperature compensation circuit. The diagrammatic illustration of the span compensation is depicted in FIG. 10. In the figure, R1 to R4 are representative of semiconductor strain gauges; reference numeral 52 designates an amplifier for controlling bridge current $I_O$; 50 a reference current; 51 a current amplifying transistor; $R_S$ a span compensation circuit.

If $R_Z = 0$ in the equation (3), $$V_O \approx \Delta R I_O \tag{7}$$

The span compensation is to make "$V_O$" unchange with temperature variation. Accordingly, the temperature characteristic of $I_O$ must be $$\frac{1}{I_O} \frac{\partial I_O}{\partial T} = -\frac{1}{\Delta R} \frac{\partial \Delta R}{\partial T} \tag{8}$$

From FIG. 10, the exciting current $I_O$ is given $$I_O = E_S / R_S$$

Since $E_S$ is constant with respect to temperature $$-\frac{1}{I_O} \frac{\partial I_O}{\partial T} = \frac{1}{R_S} \frac{\partial R_S}{\partial T} = \frac{1}{\Delta R} \frac{\partial \Delta R}{\partial T} \tag{9}$$

The second and third terms in the equation (9) are equivalent to the equation (6). In the span compensation, the variable resistor is unnecessary so that the resistors 34 and 35 in FIG. 1 must be replaced by a single resistor. The remaining conditions of the span compensation are the same as those in the zero-point shift compensation. In the present invention, the temperature compensator in FIG. 1 for the zero-point shift adjustment and the temperature compensator for the span adjustment in FIG. 10 may together be assembled into the semiconductor strain gauge.

We claim:

1. In a semiconductor strain gauge with a temperature compensator having a bridge circuit with four arms including semiconductor strain gauge elements to which pressure or strain is applied, said bridge circuit having input terminals for coupling a DC power suply with a pair of diagonally opposite junctions of said bridge circuit per se and output terminals for driving an output of said bridge circuit from a pair of remaining diagonally opposite junctions of said bridge circuit, initial zero-point temperature compensators each connecting in series and in parallel to each of semiconductor strain gauge elements on adjacent two arms of said bridge circuit and each comprising resistors for equalizing the resistance values and the temperature coefficients of all the semiconductor strain gauge elements when no pressure or strain is applied to the semiconductor strain gauge elements on the four arms, and a first temperature compensator for zero-point shift adjustment which is provided between the arms closer to one of the output terminals and is comprised of resistors for making the temperature coefficient of said first temperature compensator equal to that of the sensitivity of the semiconductor strain gauge element, the improvement wherein said first temperature compensator for zero-point shift adjustment is comprised of:

a first circuit including a temperature sensitive element with a positive primary temperature coefficient and a resistor connecting in series to the temperature sensitive element;

a second circuit including a parallel circuit including a thermistor and a resistor connecting in parallel to the thermistor and a resistor connecting in series to the parallel circuit;

a third circuit including a fixed resistor and a variable resistor with a common terminal connecting in parallel to the fixed resistor, the common terminal of the variable resistor connecting to one of the output terminals which is closer to the common terminal per se, said first to third circuit being connected in parallel and wherein B constant of the thermistor falls within a range 2,000° K. to 3,000° K. and the resistance value of the thermistor falls with a range 0.5 KΩ to 5 KΩ, and the resistance value of the temperature sensitive element with a positive primary temperature coefficient falls within a range 0.5 kΩ to 5 KΩ.

2. A semiconductor strain gauge with a temperature compensator according to claim 1, further comprising a second temperature compensator for zero-point shift adjustment provided between the arms closer to the other output terminal, said second temperature compensator having the same construction as said first temperature compensator.

3. A semiconductor strain gauge with a temperature compensator according to claim 2, wherein the variable resistor in the third circuit in said second temperature compensator is a variable resistor with a tap.

4. A semiconductor strain gauge with a temperature compensator having a bridge circuit with four arms including semiconductor strain gauge elements to which pressure or strain is applied, said bridge circuit having input terminals for coupling a DC power supply with a pair of diagonally opposite junctions of said bridge circuit per se and output terminals for driving an output of said bridge circuit from a pair of remaining diagonally opposite junctions of said bridge circuit, initial zero-point temperature compensators each connecting in series to each of semiconductor strain gauge elements on adjacent two arms of said bridge circuit and each comprising resistors for equalizing the resistance values and the temperature coefficients of all the semiconductor strain gauge elements when no pressure or strain is applied to the semiconductor strain gauge elements on the four arms, wherein a temperature compensator for span adjustment is provided between one of the input terminals and the DC power supply and is comprised of resistors making the temperature coefficient of the temperature compensator per se equal to that of each of the semiconductor strain gauge elements and further is comprised of:

a first circuit including a temperature sensitive element with a positive primary temperature coefficient and a resistor connecting in series to the temperature sensitive element;

a second circuit including a parallel circuit including a thermistor and a resistor connecting in parallel to the thermistor and a resistor connecting in series to the parallel circuit; and     a third circuit including a fixed resistor and a variable resistor with a common terminal connecting in parallel to the fixed resistor, said first to third circuits being connected in parallel and wherein B constant of the thermistor falls within a range 2,000° to 3,000° K. and the resistance value of the thermistor falls within a range 0.5 to 5 KΩ, and the resistance value of the temperature sensitive element with a positive primary temperature coefficient falls within a range of 0.5 to 5 KΩ.

5. A semiconductor strain gauge with a temperature compensator according to claim 1, 2, 3 or 4, wherein the temperature sensitive element is a semiconductor diffusion type resistor.

6. A semiconductor strain gauge with a temperature compensator having a bridge circuit with four arms including semiconductor strain gauge elements to which pressure or strain is applied, said bridge circuit having input terminals for coupling a DC power supply with a pair of diagonally opposite junctions of said bridge circuit per se and output terminals for driving an output of said bridge circuit from a pair of remaining diagonally opposite junctions of said bridge circuit, initial zero-point temperature compensators each comprising a fixed resistor connecting in series to each of the semiconductor strain gauge elements on the adjacent two arms and another fixed resistor connecting in parallel to the former fixed resistor and the semiconductor strain gauge element and each further comprising resistors for equalizing the resistance values and the temperature coefficients of all the semiconductor strain gauge elements when no pressure or strain is applied to the semiconductor strain gauge elements on the four arms, two temperature compensators for zero-point shift adjustment each provided between the arms closer to one of the output terminals and each is comprised of resistors for making the temperature coefficient of the temperature compensator equal to that of the semiconductor strain gauge element, and a constant current control unit for feeding a constant current to said bridge circuit and provided between one of the input terminals and the DC power supply, wherein a temperature compensator for span adjustment is provided between the other input terminal and the DC power supply and is comprised of resistors making the temperature coefficient of the temperature compensator per se equal to that of each of the semiconductor strain gauge elements and the temperature compensators for zero-point shift adjustment and a temperature compensator for span adjustment each are comprised of a first circuit including a semiconductor diffusion type resistor with a positive primary temperature coefficient and a resistor connecting in series to the temperature sensitive element, a second circuit including a parallel circuit including a thermistor and a resistor connecting in parallel to the thermistor and a resistor connecting in series to the parallel circuit, and a third circuit including resistors, said first to third circuits being connected in parallel, and wherein B constant of the thermistor falls within a range 2,000° to 3,000° K. and the resistive value of the thermistor falls within a range 0.5 to 5 KΩ, and the resistance value of the semiconductor diffusion type resistor with a positive primary temperature coefficient falls within a range 0.5 to 5 KΩ.

7. A semiconductor strain gauge with a temperature compensator according to claim 6, wherein said third circuit in one of said temperature compensators for zero-point shift adjustment is comprised of a parallel circuit including a fixed resistor and a variable resistor with a tap while said third circuit in the other temperature compensator is comprised of a parallel circuit including a fixed resistor and a variable resistor with a common terminal, and the common terminals of the variable resistors are connected to the closer output terminals, respectively.

* * * * *